(12) United States Patent
Amoriello

(10) Patent No.: US 10,569,714 B2
(45) Date of Patent: Feb. 25, 2020

(54) ROOF BOX FOR TRANSPORTING LUGGAGE ON A VEHICLE ROOF

(71) Applicant: Roberto Amoriello, Bolzano (IT)

(72) Inventor: Roberto Amoriello, Bolzano (IT)

( * ) Notice: Subject to any disclaimer, the term of this patent is extended or adjusted under 35 U.S.C. 154(b) by 0 days.

(21) Appl. No.: 16/302,602

(22) PCT Filed: May 16, 2017

(86) PCT No.: PCT/IT2017/000098
§ 371 (c)(1),
(2) Date: Nov. 16, 2018

(87) PCT Pub. No.: WO2017/199270
PCT Pub. Date: Nov. 23, 2017

(65) Prior Publication Data
US 2019/0202366 A1    Jul. 4, 2019

(30) Foreign Application Priority Data

May 17, 2016 (IT) .......................... 202016000050159

(51) Int. Cl.
*B60R 9/00* (2006.01)
*B60R 9/055* (2006.01)

(52) U.S. Cl.
CPC .................................. *B60R 9/055* (2013.01)

(58) Field of Classification Search
CPC ..................................................... B60R 9/055
USPC ......................................................... 224/328
See application file for complete search history.

(56) References Cited

U.S. PATENT DOCUMENTS

| | | | | | |
|---|---|---|---|---|---|
| 2,812,992 | A | * | 11/1957 | Lysen | B60R 9/055 312/311 |
| 4,071,176 | A | * | 1/1978 | Tuzee | B60R 9/12 211/70.5 |
| 4,084,735 | A | * | 4/1978 | Kappas | B60R 9/055 211/70.5 |
| 4,117,964 | A | * | 10/1978 | Sage | B60R 9/055 220/668 |
| D295,620 | S | * | 5/1988 | Littrell | D12/413 |
| 4,867,361 | A | * | 9/1989 | Burnham | B60R 9/055 224/310 |
| 2006/0043130 | A1 | * | 3/2006 | Dabrowski | B60R 9/05 224/328 |

(Continued)

FOREIGN PATENT DOCUMENTS

| | | |
|---|---|---|
| DE | 3419430 A1 | 11/1985 |
| DE | 9003443 U1 | 10/1990 |

(Continued)

*Primary Examiner* — Peter N Helvey
(74) *Attorney, Agent, or Firm* — Smartpat PLC

(57) ABSTRACT

The invention relates to a roof box for transporting luggage on a vehicle roof, comprising: —a hollow body (1), which can be mounted on the roof rails (10) of a vehicle and which is provided with an opening (2*a*), through which it is possible to access the interior which is intended for luggage; —a flap (3*a*), which is pivotally connected to the hollow body (1) and which can be pivoted from a closed position, in which it (3*a*) closes the opening (2*a*), to an open position, in which it (3*a*) does not obstruct the opening (2*a*), and vice versa; —fastening means for fastening the hollow body (1), detachably if required, to the roof rails (10) of a vehicle. According to the invention, the opening (2*a*) is located in a side face of the hollow body (1).

8 Claims, 3 Drawing Sheets

(56) References Cited

U.S. PATENT DOCUMENTS

| | | | | |
|---|---|---|---|---|
| 2007/0164066 A1* | 7/2007 | Jones | ............... | B60R 9/055 224/328 |
| 2008/0169322 A1* | 7/2008 | McMillan | ............... | B60R 9/055 224/328 |
| 2011/0084104 A1* | 4/2011 | Long | ............... | B60R 9/055 224/328 |
| 2014/0132022 A1* | 5/2014 | Espig | ............... | B60R 9/055 296/37.7 |

FOREIGN PATENT DOCUMENTS

| | | | |
|---|---|---|---|
| GB | 724687 | A | 2/1955 |
| GB | 2119331 | A | 11/1983 |
| WO | 2007078207 | A1 | 7/2007 |

\* cited by examiner

ROOF BOX FOR TRANSPORTING LUGGAGE ON A VEHICLE ROOF

TECHNICAL FIELD

The disclosure relates to a roof box for transporting luggage on a vehicle roof.

BACKGROUND

A first type of roof box is of a traditional type, and comprises: a hollow body of a parallelepiped shape, which can be positioned on the roof rails of a motor vehicle and is provided with an opening through which it is possible to access his inner space intended for luggage; a lid, which is hinged to the top of the hollow body and is movable from a closed position, in which the lid closes the opening, to an open position, in which the lid does not obstruct the opening, and vice versa; fastening means for fastening, detachably as needed, the hollow body to the roof rails of a motor vehicle. However, this well-known type of roof box has proved to be unsuitable for carrying luggage on the roof of a vehicle, since its square shape causes problems of aerodynamics. Furthermore, due to the considerable height from the ground at which is positioned the opening of the hollow body, it is difficult to load the luggage into the inner space of the hollow body, so for this purpose it is almost always necessary to disassemble the roof box from the roof.

In order to overcome the problems of aerodynamics and also to facilitate access to the space intended for luggage, a second type of roof box has been developed with a more aerodynamic shape, in particular a longer and lower shape. These well-known aerodynamic boxes differ from the first type, previously described, in that in place of the hollow body and the lid, there are two half-shells, which are arranged one above the other, enclose the space intended for luggage and are reciprocally movable, to make the luggage space accessible. More particularly, one of the two half-shells, the lower one, is fixed to the vehicle roof rails, while the other, the upper half-shell, is hinged to the fixed half-shell, and can therefore be rotated, with respect to the fixed half-shell, from a closed position, in which it rests on the underlying fixed half-shell, to an open position, thanks to which the space between the two half-shells is made accessible, and vice versa. When the roof box is opened, the movable half-shell, i.e. the upper half-shell, is rotated upwards, while when the roof box is closed, the movable half-shell, i.e. the upper half-shell, is rotated downwards. In the case of this second type of roof box, however, the fact that the space intended for luggage is enclosed by two mutually movable shells, undermines a complete exploitation of this space, since in the open position of the roof box the walls that contain the luggage laterally are only those of the fixed half-shell, i.e. the lower one. This second type of roof box also presents a loading difficulty due to the height from the ground, since to close the movable half-shell that is in the open position it is necessary to climb, keeping the car door open, at least onto the vehicle floor or even onto the seat and stretch over the roof to grasp the edge of the movable half-shell and pull it down.

Documents U.S. Pat. No. 2,812,992 A, GB 119331 A and US 2007/164066 A1 concern and show a third known type of roof box, in which the opening is arranged on a lateral side of the hollow body. It is possible to access from the side the inner space intended for luggage and no longer from the top as provided for in the other known types of roof box, which greatly facilitates the accessibility to this inner luggage space, since the height to which luggage must be lifted is greatly lowered and it is also possible to look inside this inner space to see how much space is available.

The lateral side in which the opening is arranged is a longitudinal lateral side of the hollow body. In this case the flap can be large-sized, which further increases the accessibility to the inner space of the hollow body without compromising the full exploitation of the inner space.

The roof box of the above-mentioned document U.S. Pat. No. 2,812,992 A also has a plurality of bodies, which are located inside the hollow body and on which the luggage containers can be placed in a removable manner. Since, starting from the bottom of the hollow body, these bodies extend upwards and protrude into the inside of the hollow body, the luggage cannot be placed directly on the bottom of the hollow body.

Document DE 3419430 A1 shows a further known roof box of the aforementioned third type, in which it can be seen that the opening can also be in a transverse lateral side of the hollow body. In this case it is possible to insert into the roof box objects that are as long as the roof box, with extreme ease and from the side.

SUMMARY

Starting from the context described above, the object of the present disclosure is to improve a roof box of the type initially mentioned, so that it is particularly accessible and convenient to use in particular because the space intended for luggage is easily accessible and can be fully utilized.

This objective is achieved by a roof box for transporting luggage on a vehicle roof which has a hollow body that can be positioned on roof rails of a vehicle. It is provided with an opening and a further opening, through which it is possible to access an inner space thereof. The opening is arranged in a longitudinal lateral side of the hollow body and the further opening is arranged in a transverse lateral side of the hollow body. A flap is hinged on the longitudinal lateral side to the hollow body and rotatable from a closed position, in which the flap closes the opening, to an open position, in which it the flap does not obstruct the opening, and vice versa. A further flap is hinged on the transverse lateral side to the hollow body and is rotatable from a closed position, in which the further flap closes the further opening, to an open position, in which the further flap does not obstruct the further opening, and vice versa. Fasteners detachably fasten the hollow body to the roof rails of the vehicle. Flat bodies divide the inner space of the hollow body. A plurality of protrusions are arranged inside the hollow body and form supports on which the flat bodies can removably rest. The protrusions extend along inner side walls which delimit the inner space of the hollow body. One of the protrusions is arranged at a constant height from a bottom of the hollow body.

It is now possible to divide the inner space of the hollow body into specific areas, for example to load specific luggage with specific characteristics in said specific areas.

The flat bodies may be plates and the plates may rest on one of the protrusions and divide the inner space of the hollow body into two distinct inner compartments. The further opening may provide access to a lower of the two distinct inner compartments from the outside. Alternatively, the flat bodies may be strips which are connected to each other by flexible elements so as to form a rollable strip assembly, and the rollable strip assembly may rest, after being unrolled, on one of the protrusions and divide the inner space of the hollow body into two distinct inner compartments. The further opening may again provide access to a lower of the two distinct inner compartments from the outside. It is thus possible to divide the inner space of the hollow body into two distinct inner compartments, one of which is intended for particularly long luggage. When using a rollable set of strips it is also particularly easy to switch from the situation with two inner compartments intended for luggage to the general situation in which the entire inner space of the hollow body forms a single compartment intended for luggage, and vice versa.

If the further opening is arranged near the bottom of the hollow body, then by opening the further flap, access to the bottom of the hollow body is possible through the opening.

The lateral side in which the further opening is arranged is suitably the transverse side facing the rear side of the vehicle, so that this opening is in a protected position and is not directly struck by air.

A simple and economical embodiment of means for fastening, detachably as needed, the hollow body to the roof rails of a vehicle consist of a plurality of U-shaped elements and a plurality of plaques. Each U-shaped element encloses within it a bar of the roof rails of the vehicle and is closed on its open side by a respective plaque screwed to the U-shaped element.

If the roof box has a wedge-shaped hollow body, then it has an aerodynamic shape, so as to minimize the aerodynamic problems caused by its transport on the roof of a vehicle.

Lastly, the roof box may comprise a lateral containment structure, which is arranged on the upper surface of the hollow body and extends along the perimeter thereof and thus allows additional luggage to be placed on the surface of the hollow body. Such lateral containment structure may also be used to anchor the straps and fasten such additional luggage.

BRIEF DESCRIPTION OF THE DRAWINGS

Further advantages and features will appear more evident from the following description of examples of the roof box for transporting luggage on a vehicle roof, illustrated purely by way of an indicative and non-limiting example, based on the drawings.

DETAILED DESCRIPTION

The drawings show a roof box for transporting luggage on a vehicle roof. The roof box comprises a hollow body 1, a flap 3a and fastening means. The latter are used to fasten, detachably as needed, the hollow body 1 to the roof rails 10 of a vehicle.

Figure 1:
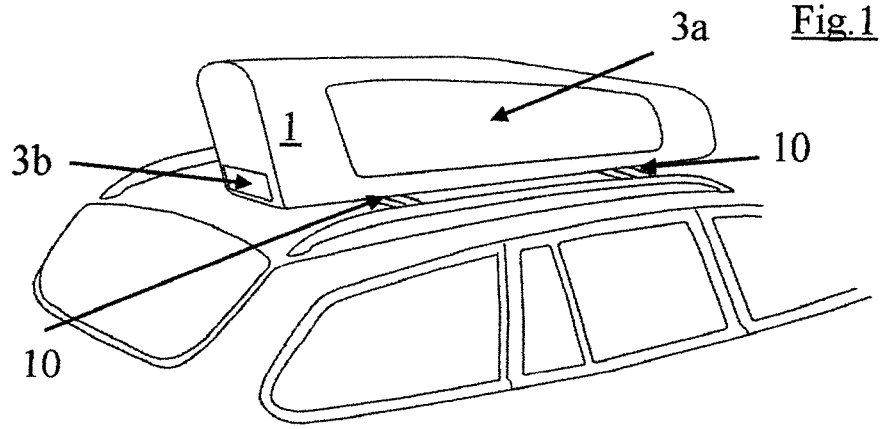
FIG. 1 schematically shows in perspective a roof box arranged on the roof rails of a vehicle.
Figure 2:
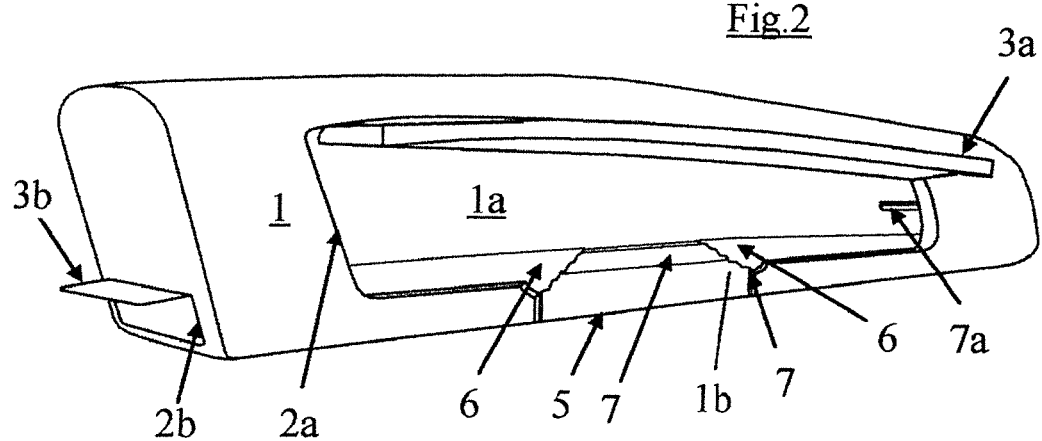
FIG. 2 schematically shows in perspective the roof box in FIG. 1, the flap and the further flap of the hollow body having been represented in their open positions and inside the hollow body both some flat bodies and a continuous protrusion, on which such flat bodies rest, having been shown in interrupted form.
Figure 4:
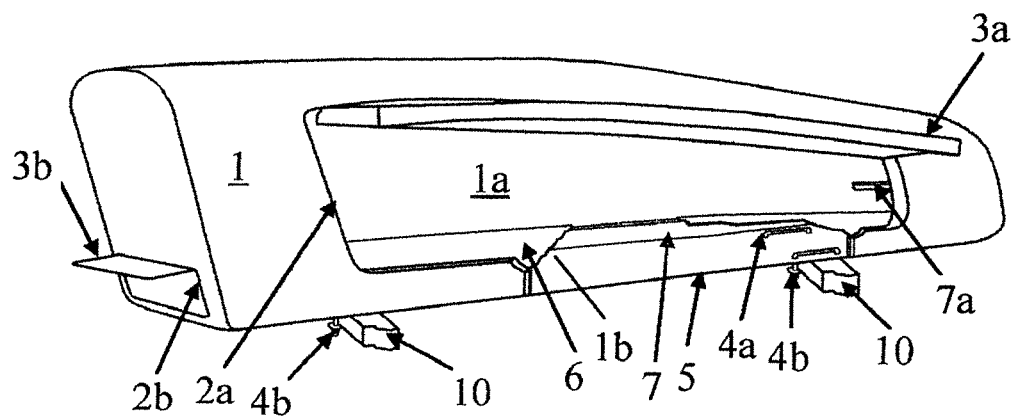
FIG. 4 schematically shows in perspective the roof box of FIGS. 1 and 2, the vehicle not being shown and both some flat bodies and the continuous projection having been represented inside the hollow body in interrupted form, so as to make the underlying fastening means visible.
Figure 7:
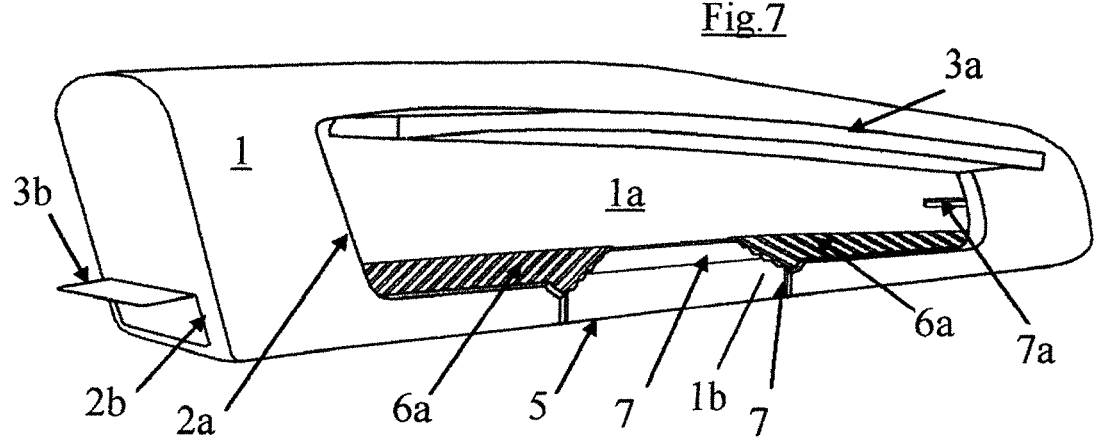
FIG. 7 schematically shows in perspective a roof box, the flap and the further flap having been represented in their open positions and inside the hollow body both the rolling and/or unrolling set of strips and a continuous protrusion on which the set of strips rests, having been represented in interrupted form.

The hollow body 1 is positioned on the roof rails 10 of a vehicle, as shown in FIG. 1, and is provided with an opening 2a through which it is possible to access the inner space thereof intended for luggage. As for the flap 3a, it is hinged to the hollow body 1 and is movable from a closed position, in which the flap 3a closes the opening 2a, to an open position, in which the flap 3a does not obstruct the opening 2a, and vice versa. In FIGS. 2, 4 and 7, the flap 3a has been shown in the open position and the inner space of the hollow body 1 is visible, i.e. the space intended to hold the luggage.

As can be seen from FIGS. 2, 4 and 7, the opening 2a is arranged in a lateral side of the hollow body 1, in particular in a longitudinal lateral side of the hollow body 1. On this lateral side, in particular longitudinal lateral side, of the hollow body 1, the flap 3a is hinged.

In FIGS. 2, 4 and 7 it can also be seen that the roof box comprises a further flap 3b. This further flap 3b is associated with a further opening 2b, provided in a transverse side of the hollow body 1, in particular in the transverse side facing the rear side of the vehicle and the further flap 3b is hinged to this transverse side, in particular the transverse rear side of the hollow body 1. The further flap 3b is movable from a closed position, in which it 3b closes the further opening 2b, in an open position, shown in FIGS. 2, 4 and 7, in which it 3b does not obstruct the further opening 2b, and vice versa. As shown in FIGS. 2, 4 and 7, the further opening 2b is placed near the bottom 5 of the hollow body 1. In this way, by opening the further flap 3b access to the bottom 5 of the hollow body 1 is possible through the opening 2b.

The roof box further comprises a plurality of flat bodies 6,6a, which are suitable to be arranged inside the hollow body 1 to divide the inner space of the hollow body 1. For this purpose, there is a plurality of protrusions 7,7a inside the hollow body 1, which 7,7a extend along the inner side walls delimiting the inner space of the hollow body 1. These protrusions 7,7a form supports on which, to divide the inner space of the hollow body 1, the flat bodies 6;6,6a can be removably laid.

One 7 of said plurality of protrusions 7,7a extends continuously at the same distance from the bottom 5, while the other protrusions 7a are arranged in such a way as to allow the creation of multiple shelves, even overlapping with each other and of different sizes.

Figure 3:
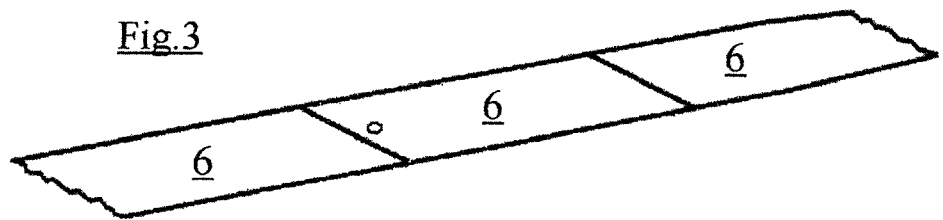
FIG. 3 schematically shows in perspective a plurality of flat bodies such as those shown in FIG. 2.

In a first example of embodiment, shown in FIGS. 2 and 4, only flat bodies 6 in the form of plates are provided. The plates 6 that rest on the protrusion 7 divide the inner space of the hollow body 1 into two distinct inner compartments 1a,1b, while the plates 6 that rest on the protrusions 7a form shelves. In FIGS. 2 and 4, the shelves have not been shown, in order not to complicate the representation, and in FIG. 3, for example, a plurality of plates 6 such as those which can be laid, one next to the other, on the protrusion 7 are visible. In FIGS. 2 and 4 the plates 6 and the continuous protrusion 7 are shown in a partially interrupted manner, to make the underlying inner compartment 1b, composed of the space between said plates 6 and the bottom 5 of the hollow body 1, visible. In practice, by means of the plates 6 and protrusion 7 it is possible to create a double bottom, which delimits the inner compartment 1b above. Opening the further flap 3b frees the further opening 2b which is the opening for accessing the inner compartment 1b from the outside.

Figure 8:
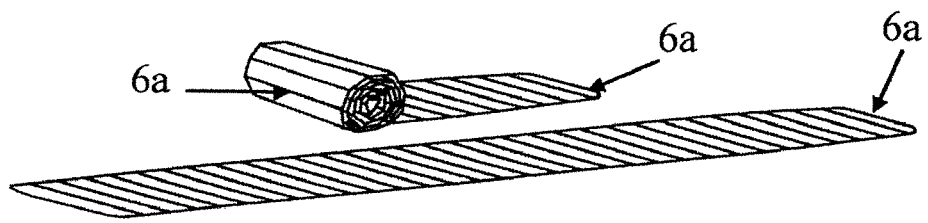
FIG. 8 schematically shows in perspective a rolling/or unrolling set of strips such as that shown in FIG. 7.

In a second example of embodiment, shown in FIG. 7, flat bodies 6a are also provided in the form of strips, which are connected to each other by flexible elements so as to globally form a rolling and/or unrolling assembly. This set of strips 6a is shown for example in FIG. 8. In this example of embodiment, only the plates 6 are supported on the protrusions 7a, to form shelves which, in order not to complicate the representation, have not been shown in FIG. 7, while the subdivision of the inner space into the two inner compartments 1a and 1b is obtained by resting the strip assembly 6a on the continuous protrusion 7, after having unrolled it.

In FIG. 7, the strip assembly 6a is represented, similarly to the plates 6 in FIGS. 2 and 4, in a partially interrupted manner to make the underlying inner compartment 1b, formed by the space between the strip assembly 6a and the bottom 5 of the hollow body 1, visible. In practice, by means of the strip assembly 6a and the protrusion 7 it is possible to create a double bottom, which delimits the inner compartment 1b above. Opening the further flap 3b frees the further opening 2b which is the opening for accessing the inner compartment 1b from the outside.

It is understood that it is not mandatory to divide the inner space of the hollow body 1, i.e. it is not mandatory to have the flat bodies 6 and/or 6a inside the inner space of the hollow body 1. The inner space of the hollow body 1 may remain undivided and in this case the luggage will rest directly on the bottom 5.

Figure 5:
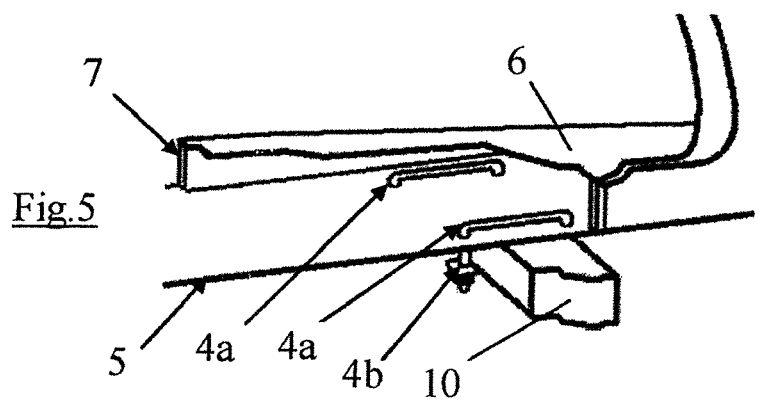
FIG. 5 schematically shows in perspective an enlargement extracted from FIG. 4.

With reference to the fasteners (fastening means) by which the hollow body 1 is secured to the roof rails 10 of a vehicle, these may consist for example, as shown in FIGS. 4 and 5, of a plurality of U-shaped elements 4a and a plurality of plaques 4b. Each U-shaped element 4a encloses within it a bar of the roof rails 10 and is closed on its open side by a respective plaque 4b screwed to it 4a, as can be seen in particular in FIG. 5.

Finally, as shown for example in FIGS. 2, 4 and 7, the hollow body 1 is wedge-shaped, i.e. it is aerodynamic.

Figure 6:
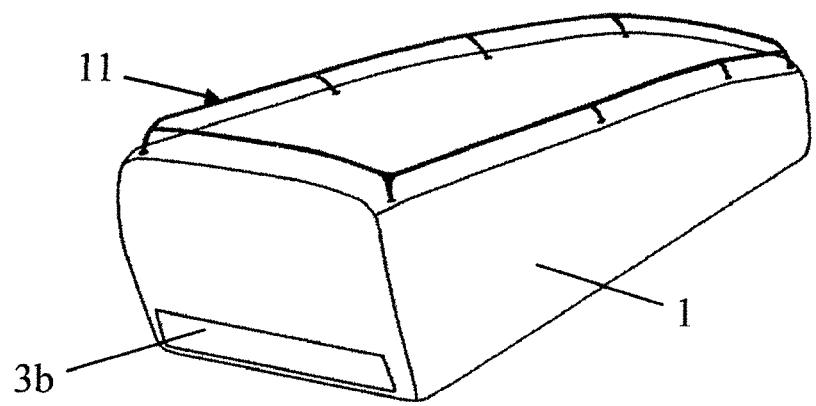
FIG. 6 schematically shows in perspective and on its own a roof box having also represented the lateral containment structure.

In FIG. 6 it can be seen that the roof box also comprises a lateral containment structure 11, which is arranged on the upper surface of the hollow body 1 and extends along the perimeter thereof. Inside the space bounded laterally by this lateral containment structure 11, additional luggage may be arranged on the upper surface of the hollow body 1. The lateral containment structure 11 prevents further luggage from sliding and falling down from the hollow body 1 and it 11 can be formed for example, as in FIG. 6, of supports distributed along the perimeter of the hollow body 1 which are connected to each other by continuous elements, so as to form a unique structure to which for example the straps for fastening such additional luggage can be anchored.

The functioning of the roof box according to the invention is as follows.

The roof box is opened by rotating the flap 3a upwards to bring it into its open position. In this way the inner space of the hollow body 1 becomes accessible and in most cases nothing more needs to be done except insert the luggage into this inner space and then close the roof box, rotating the flap 3a downwards to return it to its closed position.

In the event that there is specific luggage that must be transported separately from the remaining luggage, one or more flat bodies 6 may be placed on the appropriate protrusions 7a, in order to create one or more shelves for this specific luggage.

In the event that there is particularly long specific luggage, the inner space of the hollow body 1 can be divided into the two separate inner compartments 1a,1b. This can be done either in the manner shown in FIGS. 2 and 4 by means of the plates 6 and the continuous protrusion 7 or in the manner shown in FIG. 7 by the strip assembly 6a and the continuous protrusion 7. To insert this long luggage into the inner compartment 1b, the further flap 3b is rotated upwards to bring it into its open position allowing access to the inner compartment 1b through the further opening 2b, while the remaining luggage can be inserted into the inner compartment 1a through the opening 2a. The long luggage will rest on the bottom 5 of the hollow body 1, without coming into contact with the remaining luggage that will rest on the shelves formed by the plates resting on the protrusions 7a or on the double bottom formed in one embodiment example by the plates 6 resting on the continuous protrusion 7 or in another embodiment example by the set of strips 6a resting on the continuous protrusion 7.

If necessary, additional luggage can then be loaded on top of the hollow body 1 and inside the lateral containment structure 11.

The invention claimed is:

1. A roof box for transporting luggage on a vehicle roof, comprising:
   a hollow body (1), which can be positioned on roof rails (10) of a vehicle and is provided with an opening (2a) and a further opening (2b), through which it is possible to access an inner space thereof, the opening (2a) being arranged in a longitudinal lateral side of the hollow body (1) and the further opening (2b) being arranged in a transverse lateral side of the hollow body (1);
   a flap (3a), which is hinged on the longitudinal lateral side to the hollow body (1) and rotatable from a closed position, in which the flap (3a) closes the opening (2a), to an open position, in which the flap (3a) does not obstruct the opening (2a), and vice versa;
   a further flap (3b), which is hinged on the transverse lateral side to the hollow body (1) and is rotatable from a closed position, in which the further flap (3b) closes the further opening (2b), to an open position, in which the further flap (3b) does not obstruct the further opening (2b), and vice versa;
   fasteners for detachably fastening the hollow body (1) to the roof rails (10) of the vehicle;
   flat bodies (6,6a) to divide the inner space of the hollow body (1); and
   a plurality of protrusions (7,7a), which (7,7a) are arranged inside the hollow body (1) and form supports on which (1) the flat bodies (6; 6, 6a) can removably rest,
   wherein the protrusions (7,7a) extend along inner side walls which delimit the inner space of the hollow body (1), and
   wherein one (7) of the protrusions (7,7a) is arranged at a constant height from a bottom (5) of the hollow body (1).

2. The roof box according to claim 1,
   wherein the flat bodies (6) are plates and
   wherein the plates (6) rest on one of the protrusions (7) and divide the inner space of the hollow body (1) into two distinct inner compartments (1a,1b), the further opening (2b) providing access to a lower of the two distinct inner compartments (1b) from the outside.

3. The roof box according to claim 1,
   wherein the flat bodies (6) are strips which (6a) are connected to each other by flexible elements so as to form a rollable strip assembly, and
   wherein the rollable strip assembly (6a) rests, after being unrolled, on one of the protrusions (7) and divides the inner space of the hollow body (1) into two distinct inner compartments (1a,1b), the further opening (2b) providing access to a lower of the two distinct inner compartments (1b) from the outside.

4. The roof box according to claim 1, wherein the further opening (2b) is arranged near the bottom (5) of the hollow body (1).

5. The roof box according to claim 1, wherein the transverse lateral side in which the further opening (2b) is arranged faces a rear side of the vehicle (1).

6. The roof box according to claim 1, wherein the fasteners for detachably fastening the hollow body (1) to the roof rails (10) of the vehicle consist of a plurality of U-shaped elements (4a) and a plurality of plaques (4b), each U-shaped element (4a) enclosing within it a bar of the roof rails (10) of the vehicle and being closed on its open side by a respective plaque (4b) screwed to the U-shaped element.

7. The roof box according to claim 1, wherein the hollow body (1) is wedge-shaped.

8. The roof box according to claim 1, wherein further comprising a lateral containment structure (11), which is arranged on an upper surface of the hollow body (1) and extends along a perimeter thereof.

\* \* \* \* \*